July 5, 1960  R. B. ATTRIDGE  2,943,392
BEAM COMPASS TOOL

Filed July 12, 1957  2 Sheets-Sheet 1

INVENTOR.
RICHARD B. ATTRIDGE
BY
Attorney

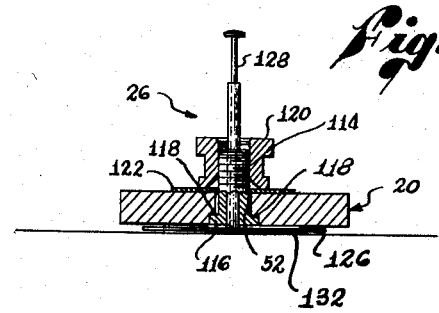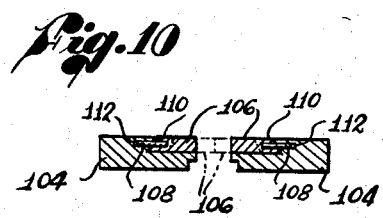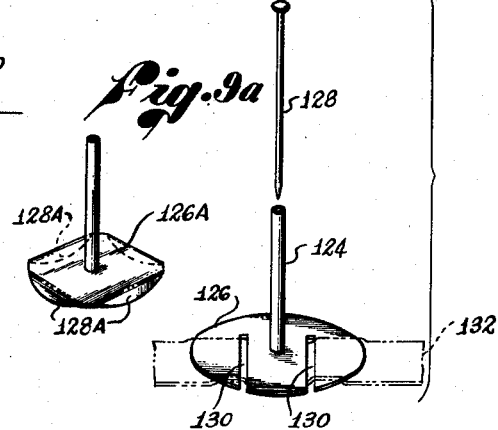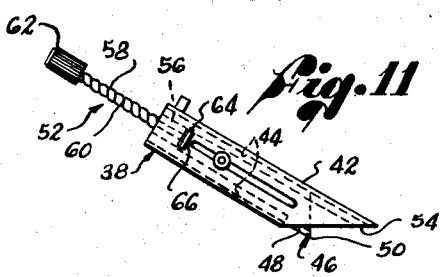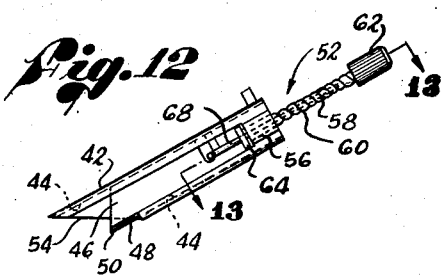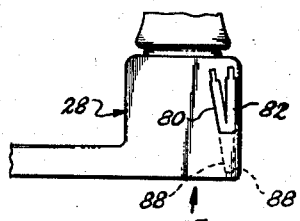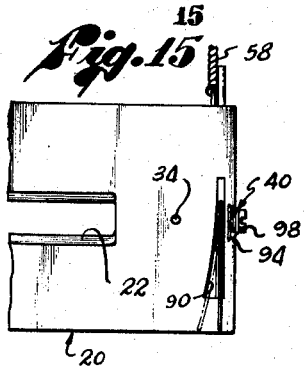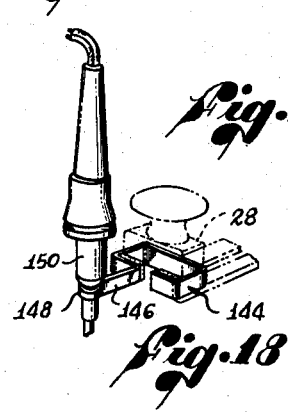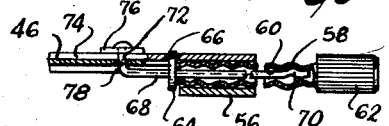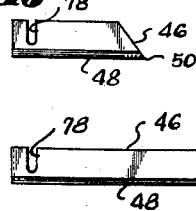
INVENTOR.
RICHARD B. ATTRIDGE

United States Patent Office 2,943,392
Patented July 5, 1960

2,943,392

BEAM COMPASS TOOL

Richard B. Attridge, 669 Valencia St., Los Angeles, Calif.

Filed July 12, 1957, Ser. No. 671,648

2 Claims. (Cl. 30—361)

This invention relates generally to hand tools, and more particularly to a beam compass tool for scribing circles on and cutting circles from sheet material.

Numerous beam compass tools, for cutting and scribing circles, have been devised. Broadly speaking, these beam compass tools comprise a "beam" having on one end a head which mounts a scribing or cuting instrument. Mounted on the beam, adjacent its other end, is a pivot adapted to be fixedly engaged with a workpiece. Generally, the spacing between the cutting or scribing instrument of the tool and its pivot is adjustable to permit the scribing or cutting of circles of different diameters.

In use of the tool, the pivot is engaged with the workpiece and the beam is rotated about the pivot as a center to cause the cutting or scribing instrument on the beam to mark or cut the material along the circumference of a circle. To facilitate this turning of the beam, a suitable handle is generally provided on the instrument-mounting head of the tool.

Existing tools of this type possess several deficiencies. The primary deficiency of the tools stems from the fact that the turning handle and "beam" are located a substantial distance above the work-engaging ends of the pivot and cutting or scribing instrument. As a result, the force applied to the handle to rotate the tool and the drag force exerted on the cutting or scribing instrument produces a couple which tends to twist the head about the axis of the beam. This tendency renders the existing beam compass tools unstable in use and awkward to manipulate. Moreover, owing to the elevated position of the beam relative to the work-engaging end of the pivot, the latter is prone to shifting about on the workpiece during use of the tool.

Difficulty is also encountered when attempting to cut or scribe relatively thin and flexible material with the existing tools. Thus, the drag exerted on the material by the cutting or scribing instrument tends to cause the material to wrinkle as the tool is turned. Such wrinkling of thin material, of course, is due to the fact that only the cutting or scribing instrument engages the material, and no means are provided for maintaining the material in a flat condition adjacent the instrument.

Many times it is necessary or desirable to cut relatively hard materials such as glass. The hardness of these materials, obviously, precludes the use of a pointed pin as the pivot of the tool. Various types of pivots have been devised for this purpose, such as suction cups, rubber pads, and the like. These existing pivot constructions for use on harder materials, however, have been found to be unsatisfactory in most cases, owing to the tendency for slippage to occur between the material and the pivot. Also, the suction cup and rubber pad pivots are relatively massive and required a substantial spacing between the beam of the tool and the work which is undesirable for the reasons just outlined.

A broad object of the present invention is the provision of a new and improved beam compass tool of the character described which avoids the above and other deficiencies of existing tools of this character.

A more specific object of the invention is the provision of a beam compass tool which is capable of accurately and easily cutting or scribing circles on both hard and soft sheet material.

Another object of the invention is the provision of a beam compass tool of the character described wherein the beam contacts and slides along the surface of the workpiece so as to stabilize the tool during use and prevent wrinkling or buckling of relatively thin sheet material, such as velvet, cloth and foil.

Yet another object of the invention is the provision of a beam compass tool of the character described wherein the turning force is applied to the tool relatively close to the workpiece so as to minimize twisting moments on the instrument mounting head of the tool.

A further object of the invention is the provision of a beam compass tool of the character described having a novel pivot construction which is uniquely designed for firm engagement with both hard and soft materials.

Yet a further object of the invention is the provision of a beam compass tool of the character described wherein the pivot is adjustable along the beam to provide a fine adjustment of the radius of the circle to be scribed or cut and wherein further the beam is of segmented construction to permit shortening or lengthening of the beam and thereby provide a coarse adjustment of the radius of the circle being cut or scribed.

Still a further object of the invention is the provision of a beam compass tool of the character described which is adapted for scribing circles on both hard and soft materials and cutting circles from softer materials and wherein further a blade assembly of the tool for cutting circles is of unique construction and design which permits fine adjustment of the depth of cut and the making of both straight and bevel cuts.

Other objects and advantages of the invention reside in various other novel structural features of the tool which is designed for simplicity, economy of manufacture and a wide variety of uses.

Further objects, advantages and features of the invention will become apparent as the description proceeds.

Briefly, the foregoing and other objects are achieved in the illustrative embodiment of the invention by the provision of a flat, longitudinally slotted beam formed at one end with a raised head. This head removably mounts a turning handle and is designed to receive an adjustable cutting blade assembly, a glass cutter and a scribing instrument such as a pencil.

Adjustably mounted in the longitudinal slot of the beam is a slideable pivot of unique design which may be fixed in any desired position along the beam. This pivot comprises, briefly, a thin flat disc mounting an upstanding sleeve which is journalled in a bushing adjustably fixed to the beam of the tool.

When using the tool, this disc rests flatly on the surface of the workpiece and the undersurface of the beam in turn rests flatly on the top of the disc. Since the disc is relatively thin, the beam of the tool rests on and slides along the workpiece as the tool is turned. This engagement of the beam with the work substantially stabilizes the tool in use and prevents wrinkling or buckling of relatively thin material.

The pivot disc is designed to receive a strip of adhesive material for firm attachment of the pivot to the surface of relatively hard material. A pointed pin slideably receivable in the sleeve of the disc is provided to form a center when relatively soft material, such as cardboard, plywood and the like, are being worked on.

In the use of the tool, the pivot is suitably fixed to the workpiece and the beam is turned about the pivot as a center, by applying a force to the handle at the outer end of the beam, to cause the particular cutting or scribing instrument which is used to cut or scribe a circle from or on the workpiece. Since this handle is located proximate to the workpiece, undesirable twisting moments on the beam of the tool are avoided, with the result that the tool possesses substantially greater stability in use and ease of manipulation.

The invention may be better understood from the following detailed description taken in connection with the annexed drawings, wherein:

Figure 8 is a section taken along line 8—8 of Figure 2;

Figure 9 is a detail, in perspective, of certain elements which comprise the pivot of the present tool;

Figure 9a illustrates a modified form of pivot;

Figure 10 is an enlarged section taken along line 10—10 of Figure 2;

Figure 11 is a detail showing one side of a blade assembly embodied in the present tool;

Figure 12 is a detail view showing the other side of the blade assembly of Figure 11;

Figure 13 is an enlarged section taken along line 13—13 of Figure 12;

Figure 14 is a detail illustrating certain blade receiving slots of the present tool for receiving the blade assembly of Figures 11 and 12;

Figure 15 is a view looking in the direction indicated by the arrow on line 15 of Figure 14;

Figures 16 and 17 illustrate cutting blades for use on the present tool; and

Figure 18 illustrates an instrument holding attachment for use on the tool.

Referring now to these drawings, the present beam compass tool will be seen to comprise a "beam" 20 including a pair of longitudinally aligned sections 20A and 20B. Sections 20A and 20B of the beam are separably connected in a manner presently described, to permit adjustment of the overall length of the beam.

Beam sections 20A and 20B comprise flat bars of rigid material such as plastic or light metal. Extending longitudinally through the beam sections 20A and 20B, and opening through the opposing ends of the latter, are slots 22 and 24, respectively. Slideably received in the slots 22 and 24, so as to be adjustable longitudinally of the beam 20, is a pivot assembly 26 about which the beam 20 is adapted to be turned as a center.

Figure 5:
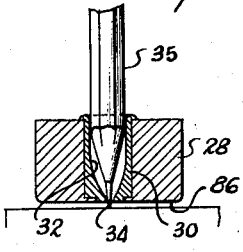
Figure 5 is a view illustrating the manner of using a pencil with the present tool to scribe a circle on a workpiece.

Integrally formed on the free end of the beam section 20A, which end is hereinafter referred to as the outer end of the beam, is an upstanding block 28. Tightly fitted in this block 28 with its axis extending normal to the beam section 20A is a ferrule 30 which may be seen most clearly in Figure 5.

Ferrule 30 is formed with an axial opening 32 which tapers inwardly at its lower end and terminates in a reduced aperture 34. When using the present tool to draw a circle on a piece of material, a pencil 35 or other suitable scribing instrument is inserted into the ferrule 30 with the point of the instrument extending through the aperture 34, in the manner shown in Figure 5.

Also removably receivable in the ferrule 30 is a handle 36. Handle 36 is used to form the beam 20 about the axis of the pivot assembly 26 when cutting a circle from sheet material.

To enable cutting of circles with the present tool, there are mounted on the block 28 a blade assembly 38, for use on relatively soft sheet materials, and a glass cutter 40 for use in cutting circles of glass. The blade assembly 38 will be described first.

Referring to Figures 11 through 13, the blade assembly 38 will be seen to comprise a blade holder 42. Blade holder 42 is formed from a strip of sheet metal, or other rigid material, which is folded inwardly along its opposite longitudinal edges to form a pair of opposing guideways 44. Slideably received in this guideway is a cutting blade 46.

Blade 46 is formed along one side with a cutting edge 48 which terminates, at the normally lower end of the blade 46, in a cutting point 50. Generally indicated at 52 are blade adjusting means for adjusting the extent of projection of the cutting point 50 of the blade below the inclined lower edge 54 of the blade holder 42. Edge 54 is inclined at approximately a 30° angle to the longitudinal axis of the blade holder.

Blade adjusting means 52 comprise a sleeve 56 rigid on the normally upper end of the blade holder 42 with its axis extending longitudinally of the holder. Rotatably received within the sleeve 56 is a tube 58 which is roll-formed, in the well-known manner, to produce an internal helical groove or thread 60. A knurled handle 62 is fixed to the outer end of the tube 58 to permit turning of the latter.

Rigidly attached to the opposite end of the tube 58 is a disc-like collar 64. The periphery of the collar 64 is rotatably received in a slot 66 formed in the side wall of the blade holder 42. Collar 64 and slot 66 serve to retain the threaded tube 58 against axial movement relative to the blade holder 42 while permitting the tube to be turned.

Extending axially through the tube 58 and projecting beyond the normally lower end of the latter is a stem 68. The inner end of the stem 68 is bent to provide a curved detent portion 70. Detent portion 70 slideably engages in the helical groove or thread 60 in the tube 58, the arrangement being such that rotation of the tube 58 relative to the stem 68 acts to move the stem axially into and out of the tube.

The projecting, lower end of the stem 68 is bent at a right angle to form a radial stem portion 72. Radial stem portion 72 is slideably received in a longitudinal slot 74 formed in the side wall of the blade holder 42. A collar 76, fixed on the outer end of the radial stem 72, retains the latter in the slot 74.

Radial stem 72 and slot 74 serve to retain the stem 68 against rotation when the tube 58 is turned. Turning of the tube 58, by the handle 62, therefore, imparts movement to the stem 68 longitudinally of the blade holder 42.

Blade 46 is formed with a transverse notch 78 adjacent the end thereof remote from the cutting point 50. In assembled condition of the blade 46 in the holder 42, the radial end 72 of the stem 68 engages in the blade slot 78 so that axial adjustment of the stem 68, in the manner just described, imparts longitudinal movement to the blade 46. Replacement of the relatively short blade, illustrated in Figure 16, by a longer blade, illustrated in Figure 17, is accomplished by threading the blade 46 outwardly of the blade holder 42 through its normally lower end, until the blade 46 may be disengaged from the radial end 72 of the stem 68.

Figure 1:
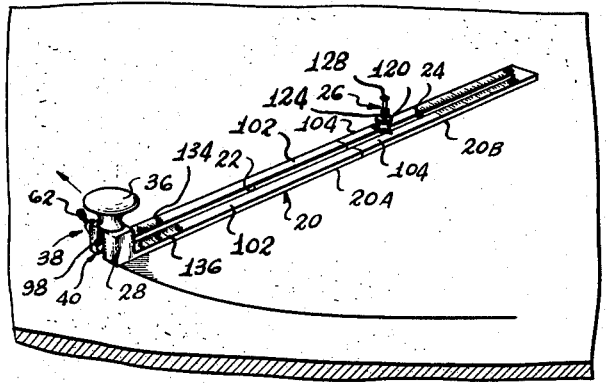
Figure 1 is a perspective view illustrating the present tool in use.
Figure 3:
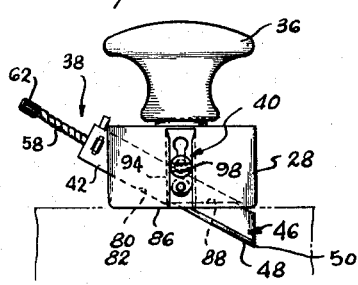
Figure 3 is a view of the left-hand end of the tool of Figure 2.

Referring now to Figures 3, 14 and 15, the upstanding block 28 on the beam section 20A is formed with a pair of slots 80 and 82 which open through the leading face of the block 28 as the beam 20 is turned in the direction indicated by the arrow in Figure 1. As shown in Figures 3, 14 and 15, the slots 80 and 82 extend through the block 28 in a plane transverse to the beam 20 and at approximately a 30° angle with respect to the undersurface 86 of the beam.

Slots 80 and 82 have a common opening through the lower face 86 of the beam and are formed with inner shoulders 88 adjacent their lower ends. The dimensions of the slots are such as to slideably receive the blade holder 42 in the manner illustrated in Figure 3. When the blade holder 42 is fully inserted into one of the slots 80 or 82, the inclined lower edge 54 of the holder abuts the shoulders 88. The gap between the shoulders 88 is such as to slideably receive the cutting blade 46.

When the blade assembly 38 is received in one of the slots 80 or 82, the extent of projection of the cutting blade 46 below the underface 86 of the beam 20 may be adjusted by turning of the blade adjusting handle 62 in the manner described above. As may be observed most readily in Figure 3, the cutting edge 48 of the blade 46, when the latter is adjusted to project below the underface 86 of the beam 20, intersects the plane of said underface on the center line of the beam. Minimum binding of the blade 46 in the material being cut therefore occurs during the cutting of a circle.

Referring to Figure 14, it will be seen that the slots 80 and 82 are inclined with respect to one another, slot 82 being located in a plane normal to the axis of the beam and slot 80 being located in a plane inclined at approximately 15° to the plane of slot 82. Blade assembly 38 is selectively positionable in either of these slots 80 or 82 so as to permit the cutting of circles with either straight or bevelled edges. Thus, when it is desired to cut a circle with a straight edge, that is, a circle whose cut, cylindric edge extends normal to the plane of the sheet material from which the circle is cut, the blade assembly is inserted in the slot 82. If it is desired to cut a circle with a bevelled edge, on the other hand, the blade assembly is inserted in the inclined slot 80.

As just mentioned, minimum binding of the cutting blade 46 in the material being cut is created, owing to the intersection of the cutting edge of the blade with the underface 86 of the beam on the center line of the latter. To further minimize binding of the blade in the circular cut in the material and prevent breakage of the blade, the inner side wall of the blade receiving slots 80 and 82 curves inwardly of the beam (see Figure 15) at the normally lower ends of the slots, toward the trailing face of the block 28 as the beam is turned in a direction indicated in Figure 1. This curvature, indicated at 90 in Figure 15, accommodates slight inward bending of the trailing portions of the cutting blade 46 to conform to the cylindric cut made by the blade.

Blade assembly 38 is employed as a cutting instrument on the present tool when the material being cut is relatively soft, as in the case of cardboard, upson board, styrafoam, and the like. When cutting circles from glass, on the other hand, the glass cutter 40 is used as a cutting instrument and the blade assembly 38 may be removed. If desired, the blade assembly may be left in position and the blade 46 merely retracted.

Glass cutter 40 comprises a short metal bar 92 which is slideably received in a slot 94 in the radially outer face of the block 28. Slot 94 extends normal to and opens through the underface 86 of the beam and is located on the center line of the latter. The side walls of the slot 94 are bevelled and undercut and the side edges of the bar 92 are correspondingly bevelled to provide for slideable retention of the bar 92 in the slot 94.

Figures 6, 7:
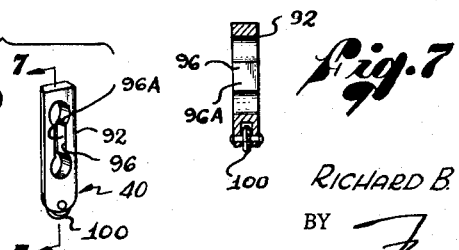
Figure 6 is a detail, in perspective, of the elements comprising the glass cutter of the present tool.
Figure 7 is a section taken along line 7—7 of Figure 6.

As shown most clearly in Figures 6 and 7, the bar 92 is formed with a longitudinal slot 96 having a reduced intermediate section 96A. Slideably received in this slot 96 and threaded into the block 28 is a screw 98 having a flat section 98A adjacent its head.

Screw 98 is provided for retaining the bar 92 in adjusted position in the slot 94. When employing the cutting blade assembly 38 or the pencil 36 on the present tool, the bar 92 is secured in elevated position in its slot 94 wherein the lower end of the bar is spaced above the underside 86 of the beam. When using the glass cutter 40 to cut the glass, screw 98 is loosened by turning it 90° counterclockwise to rotate its flat section 98A into the plane of the reduced slot section 96A in the bar 96. The bar 92 is then lowered to its cutting position, illustrated in Figure 4. Screw 98 is then tightened by turning it clockwise 90° to position its flat section 98A in a plane transverse to the bar slot 96. The width of the reduced slot section 96A is made less than the diameter of the screw. The cutter bar 92 is, therefore, positively locked in its cutting position.

In this cutting position, the lower peripheral portion of a small glass cutting disc 100, journalled in a slot in the lower end of bar 92 in the well-known manner, projects slightly below the underface 86 of the beam. When the beam 20 is turned with the bar in the cutting position, therefore, the glass cutting disc 100 engages the surface of the glass sheet being cut so as to scribe a circle on the latter. Subsequent tapping or pressing of the glass about the scribed circle causes, in the well-known manner, fracture of the glass along the circle.

Referring now to Figures 1, 2, 8, 9 and 10, the slots 22 and 24 in the beam sections 20A and 20B will be seen to form on the latter pairs of tangs 102 and 104, respectively. Extending from the inner ends of the tangs 102 of the beam section 20A are extensions 106.

Figure 2:
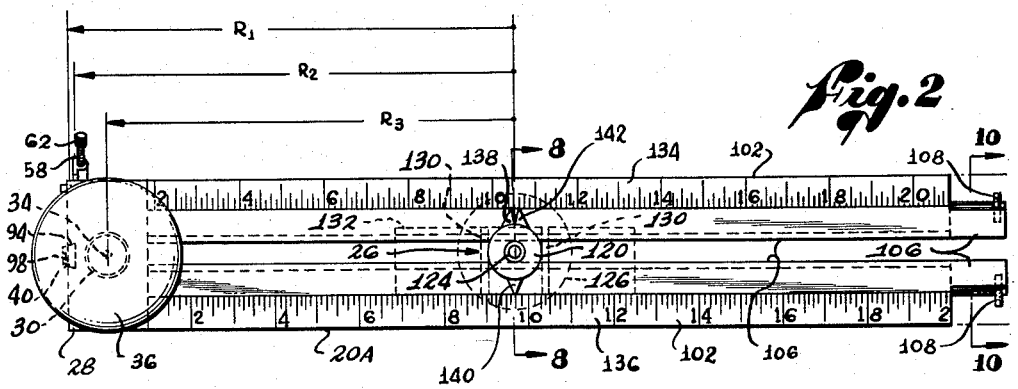
Figure 2 is an enlarged top plan view of the present tool.

As shown most clearly in Figures 2 and 10, the tang extensions 106 have their upper surfaces flush with the upper surfaces of the tangs 102 and their lower surfaces located in planes spaced a distance above the plane of the lower underface 86 of the beam. The outer side edges of the tang extensions 106 are inset a distance from the side edges of the tangs 102, and are bevelled, as shown. Pins 108 are fixed in the free ends of and project laterally from the tang extensions 106.

The radially outer ends of the tangs 104 on the beam section 20B, that is, the left-hand ends of the tangs 104 as the tool is viewed in Figure 1, are formed with undercut slots 110 (Figure 10). These slots open laterally inwardly to the longitudinal slot 24 in the beam section 20B and through the radially outer ends of the tangs. In the assembled condition of the beam sections 20A and 20B, the tang extensions 106 on the beam section 20A fit in the notches 110 in the tangs 104 of the beam section 20B.

As shown in Figure 10, the side edge walls of the notches 110 are bevelled to conform with the bevelled side edges of the tang extensions 106 and are formed with sockets 112 for slideably receiving the pins 108 on the tang extensions. When assembling or disassembling the beam sections 20A and 20B, tangs 102 of the beam section 20A are urged together, as indicated in phantom lines in Figure 10, to disengage the pins 108 on the beam section 20A from the sockets 112 on the beam section 20B. The beam sections may thereby be freely separated or joined.

Referring now to Figures 1, 2, 8 and 9, the pivot assembly 26 will be seen to comprise an externally threaded sleeve 114 having an external, annular shoulder 116 at its lower end. Sleeve 114 is slideably receivable in the slots 22 and 24 of the beam sections 20A and 20B. These slots are undercut at the underside of the respective sections to form longitudinal shoulders 118 at opposite sides of the slots. The annular shoulder 116 on the sleeve 114 engages, at opposite sides, the longitudinal shoulders 118 on the beam sections. The axial dimension of the sleeve collar 116 is substantially equal to or slightly less than the depth of the undercuts defining the beam shoulders 118. The lower end face of the sleeve 114 is, therefore, located substantially in the plane of the underface 86 of the beam.

The upper end of the sleeve 114 projects above the upper face of the beam 20. Threaded on this projecting upper end of the sleeve is a knurled nut 20 which is adapted to be tightened to lock the sleeve 114 in a fixed position longitudinally of the beam. Opposite sides of the sleeve 114 within the slots 22 and 24 of the beam sections are preferably flattened slightly to prevent turning of the sleeve relative to the beam when the nut 120 is thus tightened. A thin pointer element 122 is non-rotatably positioned on sleeve 114 between the nut 120 and the beam.

Slideably and rotatably receivable in the lower end of the sleeves 114 is a hollow tubular stem 124 rigidly fixed at its lower end to a thin disc 126 (see Figure 9). The stem 124 projects a distance above the sleeve 114 when inserted in the latter, as may be seen in Figure 8, and is adapted to slideably receive a headed pin 128 having a pointed lower end. The length of the pin 128 is somewhat longer than the length of the sleeve 124.

When using the present beam compass tool on relatively soft materials, such as cardboard, fiberboard or styrafoam, and the like, the point at the lower end of the pin 128 is forced into the material to form a center for the tool. When the beam 20 is turned, sleeve 114, which is fixed to the beam 20 by the lock nut 120, turns on the sleeve 124. Sleeve 124 is fixed against movement relative to the material by the pin 128, as just mentioned. If it is desired to center the tool on a particular point on the material, the pin 128 is first pushed completely into the sleeve 124 so that its pointed lower end extends beyond the lower end of the sleeve. This pointed end of the pin is visible from the side of the beam and may be placed in any desired point on the material. The beam is then slid downwardly along this pin into contact with the material.

In this respect, it is to be noted that the disc 126 is relatively thin so that the undersurface 86 of the beam 20, adjacent the pivot assembly 26, is located closely proximate to the material. Also, the undersurface 86 of the beam below the instrument supporting block 28 rests on and slides over the material when the beam is turned to cut or scribe a circle thereon. This contact of the beam with the material adjacent the cutting blade 46, when the latter is employed on the tool, or the scribing instrument 36, when such instrument is inserted in the ferrule 30, prevents wrinkling of thin material as previously mentioned. Owing to this contact of the beam with the material, it has been found that the present tool may be used to cut accurate circles of various diameters on extremely thin material.

As shown in Figure 9, the disc 126 of the pivot assembly 26 is formed with a pair of spaced, parallel slots 130 opening through the periphery of and extending a distance past the center of the disc at opposite sides of this center. These slots are adapted to receive a strip of adhesive tape 132, or the like, in the manner indicated in phantom lines in Figure 9. As will be observed, the tape passes below the portion of the disc between the slots 130 with its adhesive surface facing downwardly. Each end of the tape extends over and preferably somewhat beyond the disc for easy removal of the disc from the work material.

When using the present tool on relatively hard material, such as glass, which cannot be penetrated by the pointed centering pin 128, a strip of adhesive tape 132 is inserted on the disc 126, in the manner just described. The disc is then forced against the surface of the glass or other material to be cut or scribed, to produce an adhesive bond between the tape and the material. This firmly retains the disc 126 in fixed position on the material. The sleeve 114 of the pivot assembly is then slideably positioned over the stem 124 affixed to the disc whereupon the beam 20 may be turned about the stem 124 as a center.

This manner of attachment of the disc 126 to a workpiece may also be employed where it is desired to avoid making a hole in the work with the center pin 128. In some cases it may be desirable to provide an alternative disc form, shown at 126A in Figure 9a. This disc is formed with thin flanges 128A for biting into soft material, such as styrafoam, to prevent slipping of the disc relative to the work.

As shown in Figures 1 and 2, the beam sections 20A and 20B are provided with scales 134 and 136 which cooperate with pointers 138, 140 and 142, formed on the pointer element 122 on pivot sleeve 114, to indicate the radial spacing between the turning axis of the pivot assembly 26 and the instruments mounted on the tool.

Thus, the reading on scale 136 indicated by the pointer 138 indicates the radius R1 between the turning axis of the pivot assembly and the cutting edge of the glass cutting disc 100. Similarly, radii R2 and R3, between the turning axis of the pivot assembly 26 and the cutting edge of the blade assembly 38 and the scribing point of the scribing tool 35, are indicated, respectively, by the pointers 140 and 142 on the scales 136 and 134.

Indicated at 144 in Figure 18 is a removable attachment adapted to be placed over the instrument-supporting head 28 of the tool. This attachment comprises a thin, rigid arm 146 having a sleeve portion 148 at its outer end. When the attachment is positioned on the tool, the sleeve portion 148 is located on the center line of the beam.

Attachment 144 is provided for holding a wood burning tool 150, as shown. Also, a crayon or the like may be held by the attachment.

Use of the present tool is believed to be obvious in the light of the foregoing description. Thus, after affixing the pivot assembly 26 to the material to be cut or scribed, by either forcing the centering pin 128 into the material, in the case of soft material, or affixing the disc 126 to the material by adhesive tape, in the case of hard material, and adjusting the pivot assembly to the desired position along the beam 20, the latter is turned by the handle 36. If the blade assembly 38 is used, the latter will cut a circle from the material with either a straight or a bevelled cut, depending upon whether the blade assembly is inserted in the slot 80 or slot 82 of the instrument supporting block 28 on the beam. The depth of cut of the blade assembly, of course, is adjusted by turning of the handle 62 of the blade adjusting means in the manner described.

Figure 4:
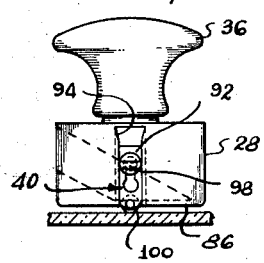
Figure 4 is a view similar to Figure 3 and illustrating a glass cutter, embodied on the tool, in operative position.

If the glass cutter 40 is to be used, the blade assembly is removed or its blade retracted and the glass cutter supporting bar 92 is adjusted to its cutting position of Figure 4. Finally, if a scribing instrument is to be used, to merely draw or scribe a circle on a piece of material, the handle 36 is removed from the ferrule 30 and a suitable scribing instrument 35 is inserted in its place, in the manner illustrated in Figure 5. When it is desired to use a wood burning instrument 150 or crayon on the tool, the attachment 144 is positioned on the beam, as shown.

In each of the above uses of the present beam tool, it will be seen that the undersurface 86 of the beam 20 rests on and slides over the material being worked on. This contact between the material and the beam supports the latter against wobbling, as is prone to occur in those instruments of this type wherein the beam is elevated a substantial distance above the material. Also, the handle 36 which is used to turn the tool, is located proximate to the material so that any twisting moments about the axis of the beam, as a result of the drag force exerted on the instrument being used by the material and the force applied to the tool, are substantially reduced or eliminated, with resultant increased stability of the tool. In this respect, it will be observed that when using the handle 36 to turn the tool, the thumb of the hand which grasps the handle may be placed against the rear face of the instrument supporting block 28. If the force to turn the tool is applied against this face by the thumb, the point of application of the force to the beam is even more nearly proximate to the material being worked on and, accordingly, the stability of the tool is even further increased.

While a preferred embodiment of the tool has been described and illustrated, numerous modifications in design and arrangement of parts will become apparent to those skilled in the art from the following claims.

I claim:

1. In a beam compass tool, a rigid elongate beam having a normally lower undersurface, an instrument supporting head on the beam, said head having a slot in a transverse plane of said beam and opening at its lower end through said undersurface of the beam and at its upper end through a face of said head, and a blade assembly including a blade holder, a cutting blade slideably supported in and extending beyond one end of said holder, and adjusting means connected to said blade and holder for adjusting the former into and out of the holder and retaining the blade in an adjusted position relative to the holder, said blade holder being removably insertable into the upper end of said slot to a position wherein said one end of the holder is spaced above said undersurface and said cutting blade projects below said undersurface, shoulder means on the wall of said slot engageable with the holder for limiting insertion of the latter to said position in the slot, and pivot means on said beam about which the latter is adapted to be rotated as a center on a workpiece with said undersurface of the beam resting on the surface of the workpiece.

2. In a beam compass tool, a flat beam having a normally lower face for bearing on a workpiece and a slot extending lengthwise of the beam, said slot opening through said lower face and the upper face of the beam, the underside of said slot being undercut to provide downwardly facing shoulders at opposite sides of the slot, an externally threaded bearing sleeve extending through said slot normal to said beam faces and slidable lengthwise of the slot, the normally lower end of said bearing sleeve being flush with the lower face of said beam and having an annular shoulder seating against said beam shoulders, a lock nut threaded on the upper end of said sleeve for locking the latter in an adjusted position along the beam, and a pivot for the beam comprising a hollow stem having a normally upper end extending slidably and rotatably through said bearing sleeve, a thin flat disc rigid on the lower end of said stem, means for fixing said disc to the surface of a workpiece, said beam being freely removable from the stem by sliding the bearing sleeve upwardly on the stem, said stem having an axial opening extending therethrough, and a centering pin slidable in said axial opening having a pointed, normally lower end and an upper, headed end which extends beyond the upper end of said stem.

References Cited in the file of this patent

UNITED STATES PATENTS

| | | |
|---|---|---|
| 174,879 | Vetterlein | Mar. 14, 1876 |
| 457,227 | Sigsbee | Aug. 4, 1891 |
| 703,538 | Cartwright | July 1, 1902 |
| 735,197 | Barr | Aug. 4, 1903 |
| 776,897 | Ferris | Dec. 6, 1904 |
| 985,978 | Coxhead | Mar. 7, 1911 |
| 1,031,354 | Machava | July 2, 1912 |
| 1,166,889 | Crutchfield | Jan. 4, 1916 |
| 1,179,706 | Doerr | Apr. 18, 1916 |
| 1,402,629 | Manly | Jan. 3, 1922 |
| 1,665,256 | Goertz et al. | Apr. 10, 1928 |
| 1,966,962 | Horhorouny | July 17, 1934 |
| 2,134,069 | Zimmerman | Oct. 25, 1938 |
| 2,161,236 | Shaw | June 6, 1939 |
| 2,233,696 | Eliel et al. | Mar. 4, 1941 |
| 2,512,235 | Lankford | June 20, 1950 |
| 2,532,776 | Linser | Dec. 5, 1950 |

FOREIGN PATENTS

| | | |
|---|---|---|
| 170,790 | Switzerland | Oct. 1, 1934 |